United States Patent [19]

Barthelme et al.

[11] 4,236,686

[45] Dec. 2, 1980

[54] SHIP COMPATIBLE LAUNCH, RETRIEVAL AND HANDLING SYSTEM FOR (VTOL) AIRCRAFT

[75] Inventors: Richard W. Barthelme, Blue Point; John B. Leonard, Northport, both of N.Y.; John N. Biercuk, Fair Lawn, N.J.

[73] Assignee: Grumman Aerospace Corporation, Bethpage, N.Y.

[21] Appl. No.: 940,379

[22] Filed: Sep. 7, 1978

[51] Int. Cl.² .............................................. B64F 1/12
[52] U.S. Cl. .................................... 244/116; 114/261; 244/135 A
[58] Field of Search ................ 244/116, 115; 114/261; 244/135 A

[56] References Cited

U.S. PATENT DOCUMENTS

| | | |
|---|---|---|
| 2,939,657 | 6/1960 | Westcott ............................ 244/115 |
| 3,091,751 | 5/1963 | Greenberg . |
| 3,401,804 | 9/1968 | Link . |
| 3,473,232 | 10/1969 | Stingl . |
| 3,487,553 | 1/1970 | Stingl . |
| 3,516,375 | 6/1970 | Charlton . |
| 3,624,783 | 11/1971 | Chang . |
| 3,807,334 | 4/1974 | Egeberg . |
| 3,843,263 | 10/1974 | Snead . |
| 3,878,805 | 4/1975 | Stevenson . |
| 3,948,467 | 4/1976 | Krusius ............................ 244/116 |
| 3,966,142 | 6/1976 | Corbett et al. . |
| 4,123,020 | 10/1978 | Korsak ............................ 244/116 |

OTHER PUBLICATIONS

Aviation Week & Space Technology, Sep. 20, 1976, "Grumman VTOL Aimed at Small-Ship Use", pp. 15-20.
Popular Science, Sep. 1976, pp. 68-70 and 148-149, "Nutcracker VTOL Folds in Flight", Kocivar.

Primary Examiner—Charles E. Frankfort
Attorney, Agent, or Firm—Morgan, Finnegan, Pine, Foley & Lee

[57] ABSTRACT

Manned or remotely piloted Vertical Takeoff and Landing (VTOL) aircraft is launched or retrieved from a capture drogue carried by an articulated boom. The capture drogue is stabilized in space for retrieval and launch and moves the aircraft to a platform while the drogue-aircraft are stabilized with respect to the platform.

6 Claims, 8 Drawing Figures

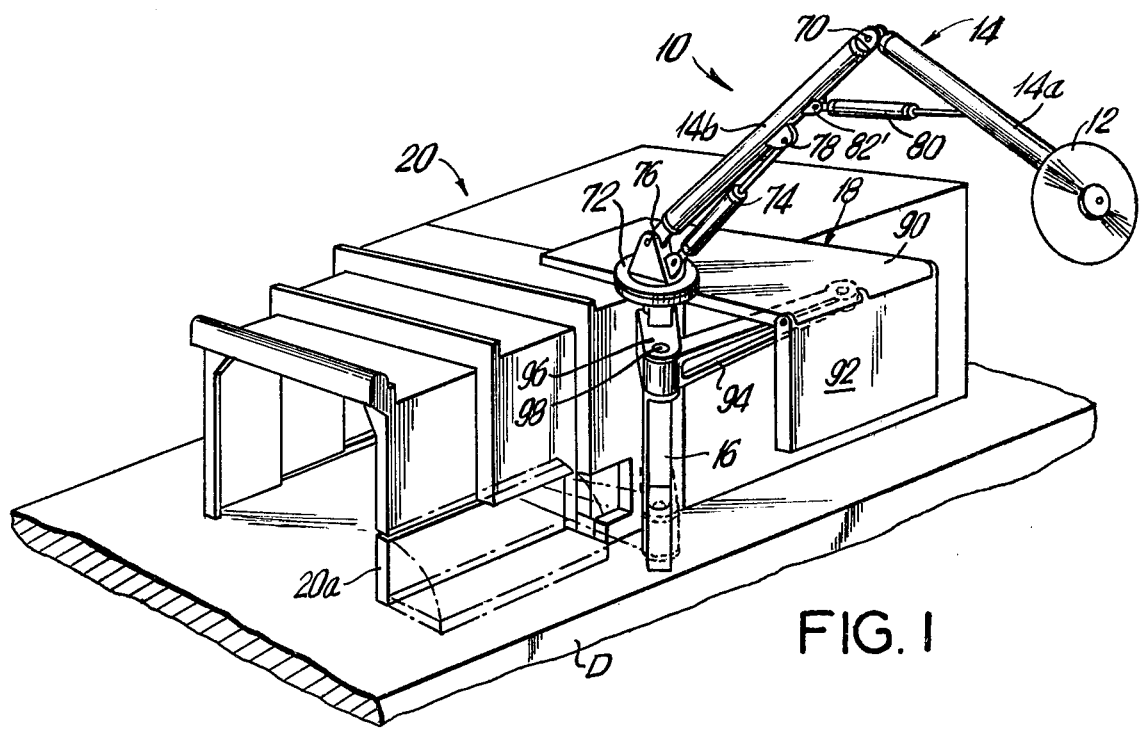
FIG. 1
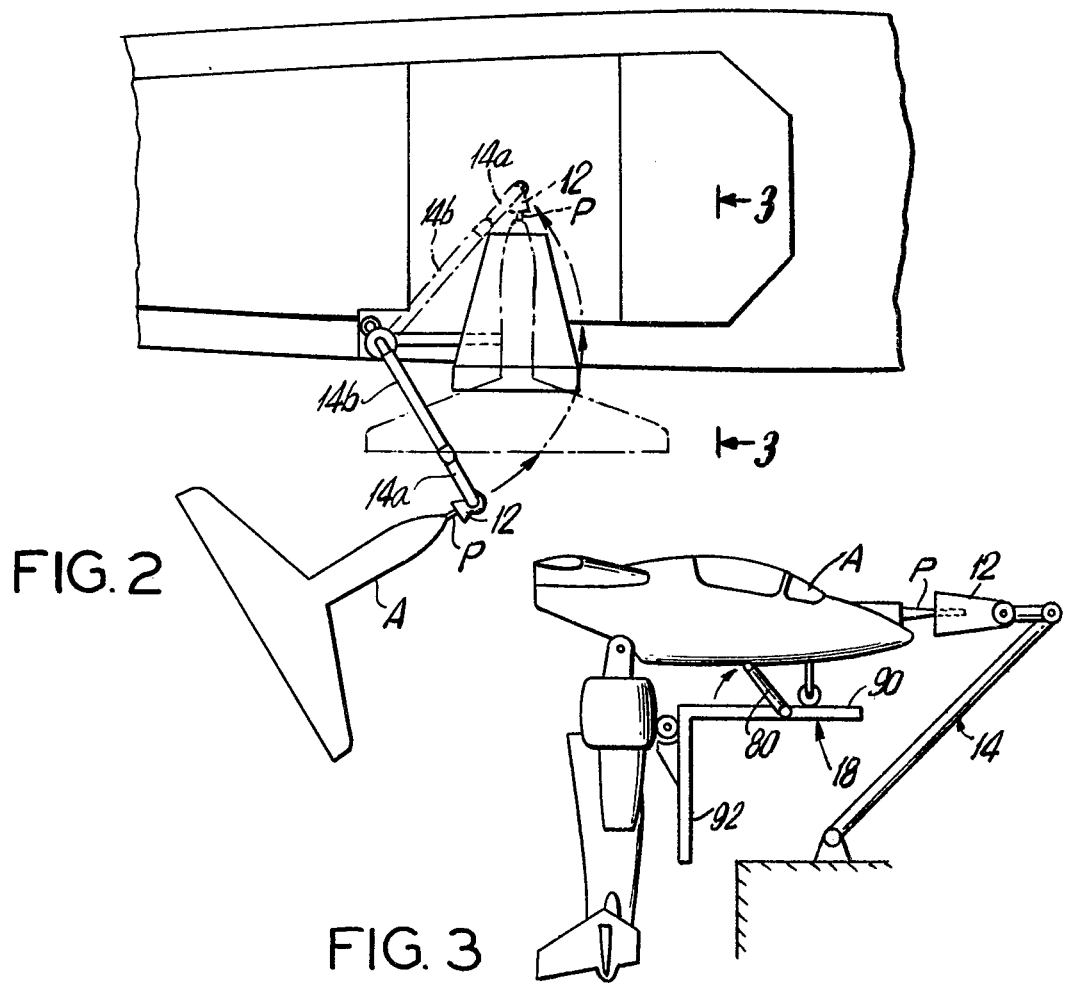
FIG. 2
FIG. 3

SHIP COMPATIBLE LAUNCH, RETRIEVAL AND HANDLING SYSTEM FOR (VTOL) AIRCRAFT

FIELD OF INVENTION

The present invention relates to the field of Vertical Takeoff and Landing (VTOL) aircraft and more particularly to a system and method for landing, launching and handling VTOL aircraft on ships.

BACKGROUND OF THE INVENTION

The present invention relates to VTOL aircraft and more particularly to so-called "tail-sitter" type VTOL in which the tail section of the aircraft is generally vertically disposed during take-off and landing operations. The invention will be described in terms of a specific tail sitter type of VTOL aircraft configuration known as a "nutcracker" which is described in Corbett et al., U.S. Pat. No. 3,966,142, the disclosure of which is hereby incorporated.

While VTOL's have increased flexibility as to their launch and landing capabilities, the difficulty of procedures is greatly increased where they are attempted from a moving platform; namely, a ship's deck on the open sea.

Various means have been proposed to facilitate landings of VTOL on the high seas. While these proposals have worked, they have various drawbacks including high cost and low reliability due to the size of the landing system and the need for pilot assistance. Moreover, high sea conditions may sometimes negate their functioning at all.

SUMMARY OF THE INVENTION

The present invention is directed to a handling system for VTOL aircraft in which launch and retrieval operations are greatly enhanced. More particularly, tail sitter VTOL are released/caught by a boom carried drogue which is stabilized in space. The VTOL is self-supporting so that the size and cost of the boom/drogue system is minimal.

The present invention can be summarized as follows: A handling system for VTOL aircraft comprising: platform means for holding said aircraft; articulatible boom means having a capture drogue at the free end thereof for said aircraft; control means for moving said boom means between a catching position wherein said drogue is stabilized with respect to free space and a landing position wherein said drogue is stabilized with respect to said platform and said aircraft is positioned on said platform, said boom means and drogue being operative to guide said aircraft between said positions while said aircraft is supported by its engine thrust.

BRIEF DESCRIPTION OF THE DRAWINGS

FIG. 1 is a partial perspective view of a handling system in accordance with the present invention on the deck of a ship;

FIG. 2 is a top plan schematic illustrating the relative positions of the VTOL and handling system in retrieval and landed positions;

FIG. 3 is a side elevation view taken generally along line 3—3 in FIG. 2 schematically illustrating the VTOL in a latched down position;

DETAILED DESCRIPTION

Figure 4:
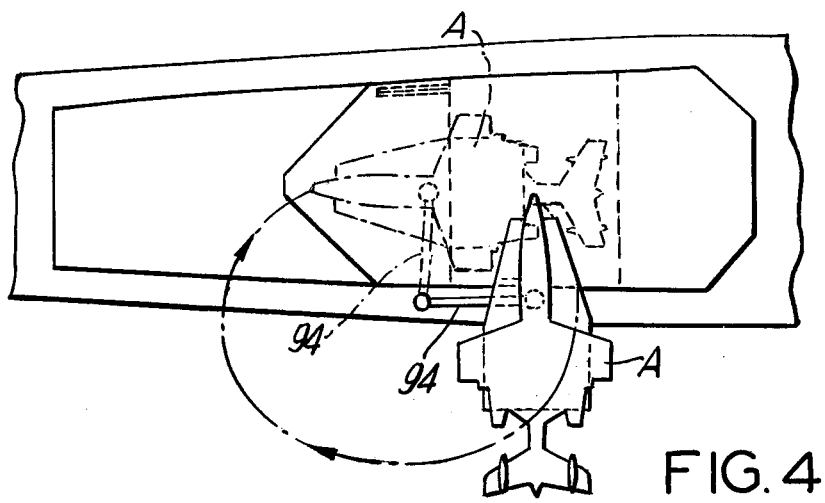
FIGS. 4 and 5 are schematic top plan and elevation views, respectively, illustrating the transfer of the VTOL from landing platform to hangar.

While this invention is susceptible of embodiment in many different forms, there is shown in the drawings and will hereinafter be described in detail a preferred embodiment of the invention, and modifications thereto, with the understanding that the present disclosure is to be considered as an exemplification of the principles of the invention and is not intended to limit the invention to the embodiments illustrated.

A handling system 10 of the present invention is shown in FIG. 1. The system 10 is illustrated as being installed on the deck D of a ship, e.g. a DE-1052 class ship.

System 10 includes a capture drogue 12 which is mounted on the end of a light weight articulated boom 14. As explained below, drogue and boom guide the VTOL aircraft during takeoff and landing without supporting the aircraft. Boom 14 is rotatably mounted on the top of a launching post 16. As will be described below, the VTOL aircraft is carried on a launching platform 18 for movement between a launching position shown in FIG. 1 and a storage position shown in FIG. 5.

Advantageously, the handling system 10 is located adjacent a hangar housing 20 whereby the VTOL aircraft may be stored or supplied to the system from below deck.

The VTOL aircraft A is of the type described in the Corbett et al. patent; namely, a split fuselage, tail sitter type VTOL aircraft. For a more complete description of the aircraft, reference should be had to the Corbett et al. patent.

Aircraft A is provided with a catching probe P, which latches with drogue 12. The probe may be coincident with the nose of the aircraft or remote therefrom, see FIGS. 2 and 3, respectively. A typical probe structure is shown in FIG. 6A. Probe P may be of any convenient configuration and includes an extended portion 31 which interconnects with the aircraft. Portion 31 includes a reduced diameter portion 31a and an enlarged diameter portion 31b to produce an annular latching surface 31c.

Probe P may be used for refueling the aircraft and to this end includes a moveable nose piece N carried in portion 31b. Nose N is normally biased outwardly by compression spring 33. When the nose N is pushed inwardly when it is latched to the drogue 12, fuel conduits 35 in the probe are exposed to receive fuel therethrough.

The aircraft A, during landing operations, approaches the stabilized drogue 12 in the tail sitting position and in such a manner as to allow the aircraft mounted probe P to enter the capture drogue. The probe P and drogue 20 are latched together on contact. The latch can be released at any time to allow abort of the landing.

Figure 6:
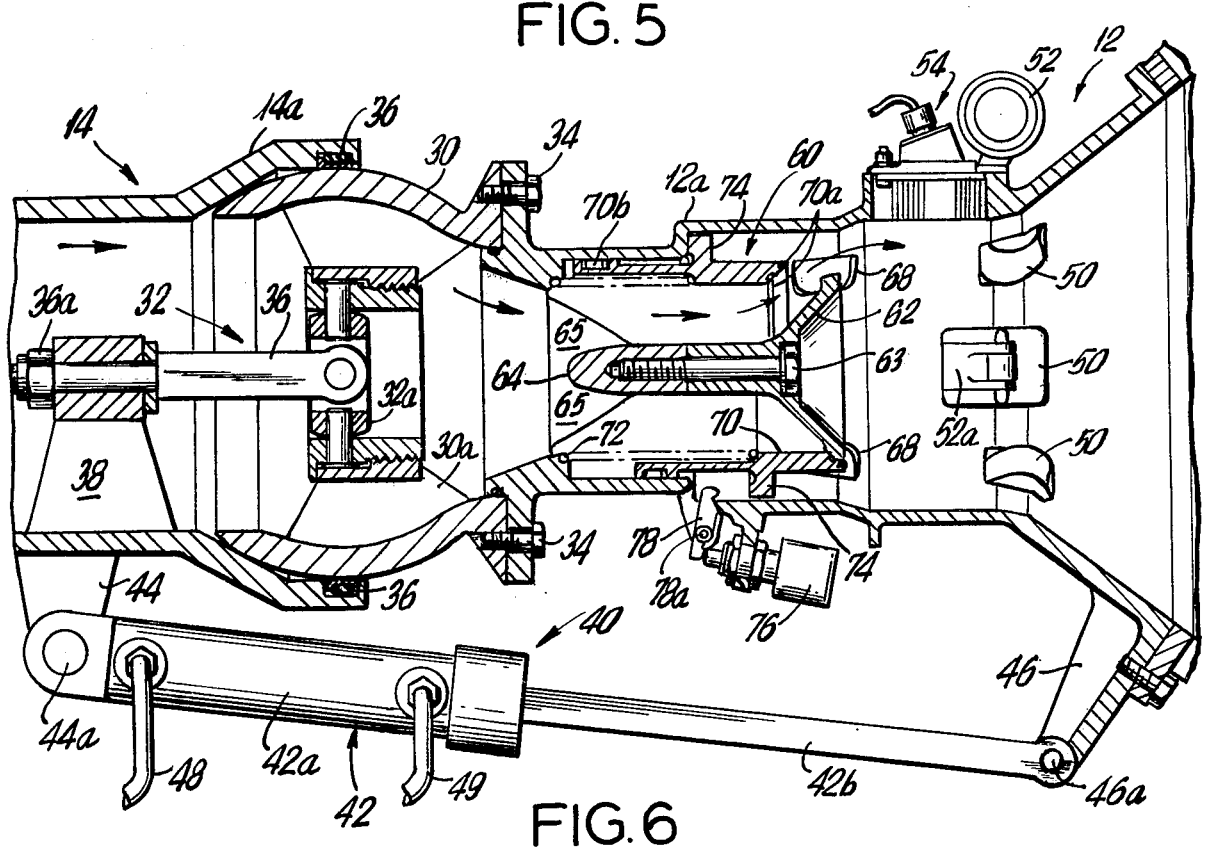
FIG. 6 is a longitudinal cross-sectional view of a capture drogue equipped with a refueling mechanism.
Figure 6A:
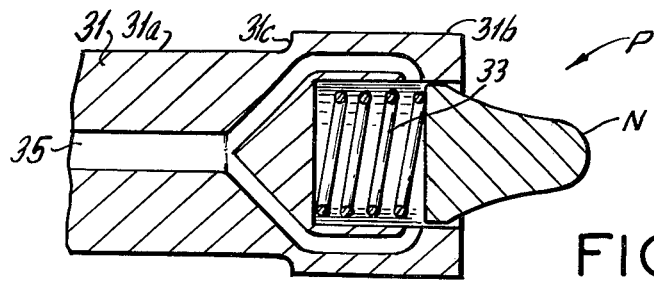
FIG. 6A is a schematic, longitudinal, cross-sectional view illustrating an aircraft refueling probe for connection with the capture drogue.

A capture drogue 12 is shown in FIG. 6. The cone shaped drogue is pivotally attached to the free-end boom 14 by a spherical sleeve 30 and universal joint 32. Sleeve 30 is attached to an extended portion 12A of the drogue by fasteners 34 and positioned within an enlarged receiver section 14a at the end of the boom 14. An annular seal gasket 36 provides fluid tight joinder is required for refueling since jet fuel is pumped through the interior of the boom 14 to the capture drogue in the direction indicated by the arrows in FIG. 6 and into conduits 35 in nose N.

Universal joint 32 is mounted within sleeve 30 on weldments 30a (only one of which is shown) which carries the outer coupling 32a. The inner coupling 32b carries rod 36 which is mounted in weldment 38 by fastener 36a. In this manner the capture drogue 12 may be angularly articulated about universal joint 32.

The articulation of the drogue is achieved by a pair of actuators 40. Only one actuator is shown in FIG. 6. The second actuator is located 90° from the one illustrated and is a similar structure. Each actuator 40 includes a fluid actuated piston 42 having a housing 42a from which a piston rod 42b extends. The end of housing 42a is pivotally attached to weldment 44 by pin 44a and the free end of rod 42b is pivotally attached to weldment 46 of drogue 12 by pin 46a. Piston 42 is a double acting piston and to this end a pair of inputs 48 and 49 are provided for introducing and removing fluid to cause the rod to be extended or retracted.

Probe P is latched into drogue 12 by means of a plurality of arcuate latches 50 which are driven into and out of engagement by latch actuators 52 and rocker arms 52a. The presence of probe P in the drogue is sensed by an induction coil sensor 54.

Refueling of the aircraft when it is engaged with the drogue is accomplished by a slide valve assembly 60 located within protrusion 12a. Assembly 60 includes a fixed nose pedestal 62 against which nose 32 abuts when the probe is inserted. Pedestal 62 is fastened by bolt 63 to a centrally disposed lug 64 supported by radial weldments 65. The leading surface of pedestal 62 is generally conical in shape and carries a peripheral sealing surface element 68. The control of fuel is achieved by a sliding sleeve 70 which is shown in the closed position at the bottom half of FIG. 6 and the open position at the top half of the figure. Sleeve 70 is normally biased to a closed position by a compression spring 72. Sleeve 70 carries a pair of seal gaskets 70a which contact pedestal 62 and seal member 68 in the closed position. Sleeve 70 also has a seal gasket 70b which maintains a slidable seal with the interior of element 12a.

When the probe enters the capture drogue nose 32 contacts pedestal 62 and is compressed to allow continued forward movement of the probe and exposure of fuel conduits 34. Enlarged portion 31b of the probe clears pedestal 67 and engages an annular shoulder 74. Continued inward movement of the probe causes the sleeve 70 to open position at about the same time that latches 50 engage area 31c of the probe. The opening of the valve is sensed by a contact switch 76 which is actuated by a lever 78. Lever 78 is carried on a pin 78a and is contacted by shoulder 74 when the valve is opened. Lever 78 rotates counterclockwise about pin 78a to operate switch 76 and thereby verify that the valve is opened through suitable circuitry.

The probe latching and refueling structure described is conventionally used for mid-air refueling and is known to those skilled in the art.

With reference to FIG. 1, boom 14 comprises two arm elements 14a and 14b which are rotatably joined at pin 70. One element 14a carries the drogue 12 and the other element 14b is rotatably attached to a circular base element 72 at the top of post 16. Angular control of element 14b is provided by a double acting cylinder 74 which is pivotally attached at its housing to base element 72 by pin 76. The free end of the piston rod is attached to boom element 14b at pin 78. Similar angular control between elements 14a and 14b is provided by double acting cylinder 80 whose housing is attached to element 14b by pin 82 and whose piston rod is pivotally attached to boom element 14a.

The entire boom assembly is rotatably mounted by base element 72 to the post 16 to permit full rotation of base element. To retrieve an aircraft the capture drogue 12 is positioned in an extended position (see FIG. 1) and stabilized in free space. The aircraft is flown toward the drogue and the probe is inserted in the drogue (see FIG. 2). The probe is latched as described above.

An important aspect of the present system is that the aircraft is self-supporting by its own thrust. Thus the boom and drogue are light weight and can be designed only for loads imparted to it resulting from forces due to ship accelerations acting on the aircraft mass.

Following probe-drogue attachment, the boom system is operated to sequentially or simultaneously bring the aircraft motion into coincidence with the ship's motion, and to lead the aircraft from the capture position (shown in solid line in FIG. 2) to contact and landing on the platform 18 (shown in phantom line in FIG. 2). The aircraft is secured to the platform 18 by a latch 80 to negate the effects of ship motion (FIG. 3). Once the aircraft is secured on platform the engine thrust may be stopped and landing is completed. The capture drogue 12 may also be unlatched from the probe P.

Landing platform 18, FIG. 1, may be used as an on board handling system. To this end, platform 18 includes a first horizontal portion 90 and second portion 92 which is power-hinged thereto. Portion 90 is carried on a horizontal boom 94, which is, in turn, rotatably mounted in a vertical carriage 96 at pin 98. The aircraft is always secured to portion 90 and when it is to be stowed in hangar 20, platform portion 92 is moved to a horizontal position which causes the tail fuselage to assume a horizontal orientation, see FIG. 4.

Figure 5:
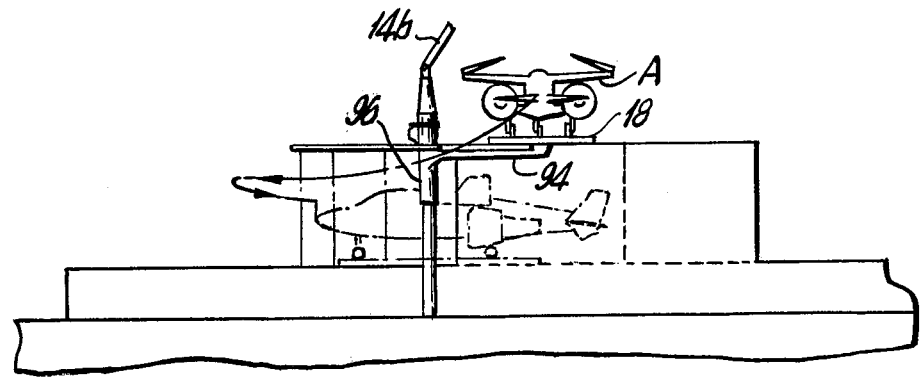

As shown in FIGS. 4 and 5, platform 18 and boom 94 are rotated about the support column and lowered by the carriage 96 to the level of the deck hangar. A rotation of approximately 270 degrees places the aircraft in the hangar, as shown in phantom line in FIGS. 4 and 5. If necessary, a drop-down clearance door 20a, FIG. 1, may be used to permit entry of the platform into the hangar. A reversal of the procedure is used for launch operations. The rotation of the aircraft and platform can be outboard of the ship, as shown, or inboard over the top of the hangar and down to deck level to minimize the effects of transient loads on the ship's stability.

Figure 7:
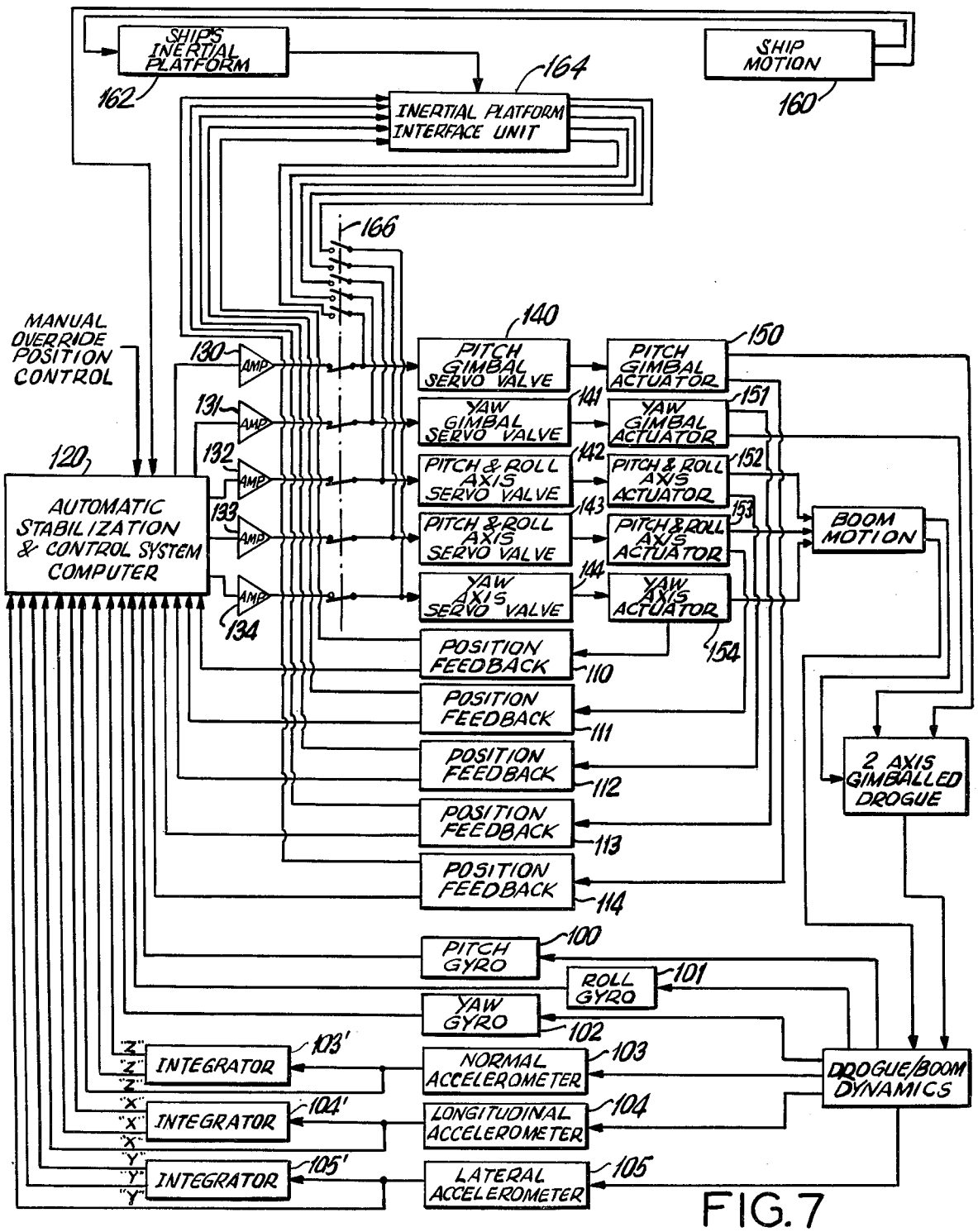
FIG. 7 is a block schematic diagram of the guidance and control system for the handling system.

The landing system 10 overcomes the limitations of prior art systems by allowing manned or unmanned flying vehicles to dock to an inertially stabilized drogue and subsequently to be guided to a moving or stationary platform acquiring platform motion, if any, in the process and within the structural constraints of the aircraft, the retrieval system and the landing platform. The control system is shown in FIG. 7. Rate and/or acceleration sensors 100, 101, 102, 103, 104 and 105 located on the drogue 12 in conjunction with position sensors 110-114, which measure the relative angles between the various articulated arms 14a and 14b, and the base 72 and between the arms and the drogue, all provide relative information to the base located digital computer 120 which provides input signals through amplifiers 130-134 to servovalves 140-144 to operate actuators 150-154, respectively, at each of the above-mentioned moving joints to accurately position the drogue inertially. The system thus provides adequate clearance between the flight vehicle and the ground or the sea throughout the landing phase and in heavy sea states. Advantageously, the system includes load limiting and damping devices incorporated as part of the overall actuation system at the articulated joints as required.

After the aircraft has docked to the stabilized drogue 12, an automatic signal from the computer or a manual input from a ship based landing officer will initiate the final landing sequence. The initial signal will be based on either an automatic prediction of a stabilized or nulled ship's motion or the landing officer's prediction thereof. After the final landing sequence has been initialed and the boom/drogue commands from the computer lead the aircraft to the landing platform, the stabilization signals are phased or programmed out such that the aircraft will acquire ship's motion immediately prior to touchdown. The automatic, programmed final landing sequence will result in an aircraft touchdown at a consistent, safe and previously selected velocity or rate of the aircraft relative to the landing platform. A nominal or normal landing sequence and touchdown rate will normally be used. However, different type vehicles, off nominal vehicle weights or an off nominal operating environment may call for the ship base landing officer calling for alternate landing sequences via manual selection of alternate programs stored in the computer.

As shown in FIG. 7, an automatic backup and/or monitoring system may be based on ship's motion information 160 from on board inertial platform(s) 162 or their equivalent normally carried aboard ships. Ship's motion information from the inertial platform 162 will be supplied to an inertial platform interface unit 164 that will also receive position feedbacks from the drogue and boom actuators 110-114. Thus, the back up system will achieve the same results as the prime system described above but generally with degraded performance. The back up system is cut in by gang switching 166.

If the prime and backup systems are inoperative and if sea state and other environmental and vehicle capabilities allow it, the ship based landing officer may use a manual override position control to lead the aircraft from the docked position to the landing platform.

These and other modifications may be made to the present invention by those skilled in the art without departing from the scope and spirit of the present invention as pointed out in the appended claims.

What is claimed is:

1. A handling system for VTOL aircraft comprising: platform means for holding said aircraft;
articulatible boom means including a pair of arm elements having a capture drogue at the free end thereof for said aircraft;
control means for moving said boom means between a catching position wherein said drogue is stabilized with respect to free space and a landing position wherein said drogue is stabilized with respect to said platform and said aircraft is positioned on said platform, said control system including input means comprising rate and/or acceleration sensors mounted on said capture drogue; position sensors for measuring the relative angles between said arm elements and said platform means and between said arm elements and said drogue; output means comprising actuators for moving said arm elements and drogue, and automatic stabilization and control means for operating said output means in response to said input means; said boom means and drogue being operative to guide said aircraft between said positions while said aircraft is supported by its engine thrust.

2. The system of claim 1, wherein said platform is arranged to receive a VTOL of the tail-sitter type.

3. The system of claim 2, wherein said platform includes a first horizontal support portion and second support portion, said second portion being pivotally mounted with respect to said first portion for movement between a coplanar horizontal position and a downwardly angled position relative to said first portion, whereby split fuselage VTOL may be received thereon.

4. The system of claim 1, wherein said platform means includes means for raising and lowering said platform and means for rotating said platform, whereby said platform may be moved between a storage position to a launch position.

5. The system of claim 1, wherein said articulatible boom is rotatable about a vertical axis.

6. The system of claim 1, wherein said capture drogue includes means for refueling said aircraft.

* * * * *